United States Patent Office

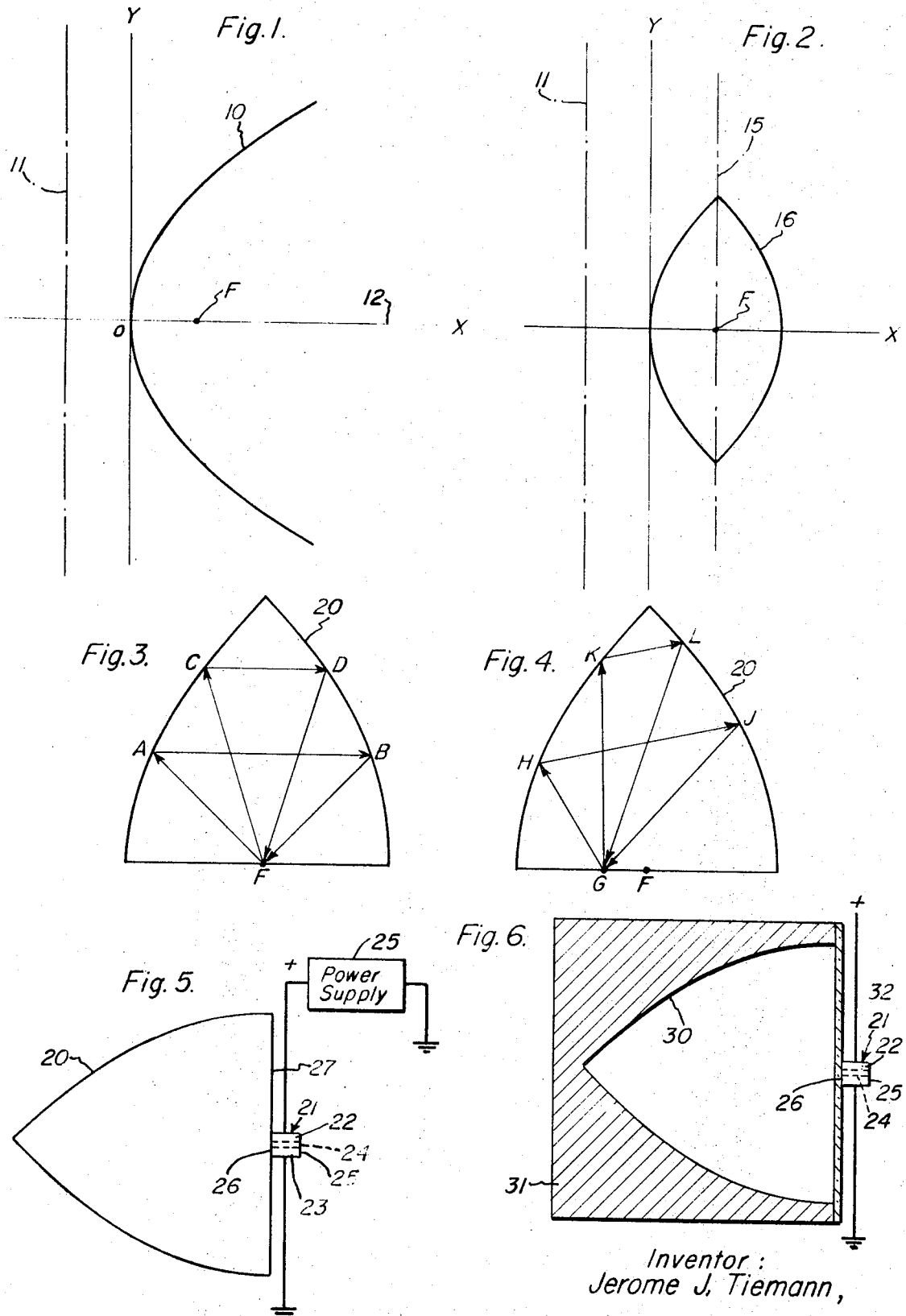

3,532,417
Patented Oct. 6, 1970

3,532,417
NONINVERTING OPTICAL REFLECTING DEVICE
Jerome J. Tiemann, Schenectady, N.Y., assignor to General Electric Company, a corporation of New York
Filed July 20, 1967, Ser. No. 654,746
Int. Cl. G02b 5/10; H01s 3/08
U.S. Cl. 350—296                               2 Claims

ABSTRACT OF THE DISCLOSURE

A noninverting reflector is formed by rotating a parabola about a line through the focus which is parallel to the directrix of the parabola and cutting the resulting structure in half through the focus with a plane perpendicular to the axis of rotation. By making the curved surface optically reflective, light from a light source situated in the focal plane near the center thereof is imaged back onto the source even if the source is not exactly on the center. The source may be a laser diode.

BACKGROUND OF THE INVENTION

This invention relates to optical reflectors, and more particularly to noninverting reflectors which permit the reflected image to follow the source.

In order to produce coherent radiation from a laser, it is necessary to have an optically resonant cavity in which a standing wave of optical energy may exist. This cavity is generally created by use of reflecting surfaces at either end of the emitting structure, such as in a Fabry-Perot resonator, to reflect light energy back upon the emitting structure. Heretofore, the necessary alignment of the reflecting surfaces of the cavity has presented a difficult problem, due to the precise positioning required of these surfaces. By use of the instant invention, the degree of precision with which such reflecting surfaces must be positioned is greatly reduced.

The reflector structure described herein focuses light back onto the point in the focal plane at which the light source is located, even if the source is not situated exactly at the focus. This property greatly simplifies the problems of aligning a resonator with respect to a laser. The reflector structure, which forms one end of the resonant cavity for the laser, also enhances resonant modes that have purely spherical wavefronts. As a consequence of this property, light emerging in the lowest mode has the proper surfaces of constant phase to be focused into a beam by a standard camera lens or parabolic mirror. Thus, the reflector structure of the instant invention is useful for communication purposes. A further consequence of the resonant cavity formed by the reflector is that the reflector, without requiring any additional focusing elements, serves to focus the energy of the laser down to a point in space. This point may be situated within the active region of the laser itself or may be outside of the active region. Therefore, it can be seen that this structure is useful for harmonic generation or other purposes where a very high photon density is required.

BRIEF SUMMARY OF THE INVENTION

Briefly, in accordance with a preferred embodiment of the invention, light reflector means are provided comprising the surface generated by rotating a parabola having a predetermined focus and directrix about an axis passing through the focus parallel to the directrix. The surface thus generated is cut in half by passing a plane through the focus perpendicular to the axis of rotation. By making the curved surfaces optically reflective, the reflected image is noninverted.

Accordingly, one object of the invention is to provide a reflector which focuses light back onto the source in the focal plane no matter where the source may be.

Another object is to provide an optical reflector for enhancing resonant modes having purely spherical wavefronts.

Another object is to provide a reflector for a laser which serves to focus the energy of the laser down to a point which may be situated either within or outside of the active region of the laser.

Another object is to provide a reflector structure which is useful for harmonic generation and other purposes requiring a very high photon density.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 illustrates a simple parabola;

FIG. 2 illustrates a solid configuration created by rotation of the parabola of FIG. 1 about a line through its focus parallel to its directrix;

FIG. 3 illustrates light rays within a body comprising only the upper half of the structure of FIG. 2, which are produced at the focus;

FIG. 4 illustrates light rays within the structure of FIG. 3 generated by a light source displaced from the focus;

FIG. 5 illustrates one embodiment of the structure of FIG. 3 when utilized in combination with a semiconductor junction laser diode; and FIG. 6 illustrates a second embodiment of the structure of FIG. 3 when utilized in combination with a semiconductor junction laser diode.

DESCRIPTION OF THE PREFERRED EMBODIMENTS

FIG. 1 illustrates a simple parabolic 10 having a directrix 11 and a focus F situated along the axis 12 of the parabola which, when plotted on Cartesian coordinates, coincides with the $x$ axis when the parabola is expressed by the equation $y^2 = 2\,px$, $p$ being the distance between directrix 11 and focus F. The distance between focus F and the vertex, which is situated at the origin $o$ of the $x$ and $y$ coordinates, is $p/2$.

A parabolic reflector, which is formed by rotating a parabola about its axis, reflects onto its focus light received along a path parallel to its axis from a distant source and conversely reflects light from a source at its focus, in parallel rays, to infinity. Thus, it is evident that if parabola 10 is rotated through 180° about an axis 15 through focus F parallel to directrix 11, resulting in the football-shaped three-dimensional structure illustrated in FIG. 2, and if the football-shaped structure is cut in half by a plane passed through focus F perpendicular to axis of rotation 15, each half of structure 16 which remains retains the focus of the original parabola which was rotated. The resulting structure 20 is illustrated in FIG. 3.

In FIG. 3, structure 20 is illustrated with internal surfaces rendered reflective to light. The light rays within structure 20 are illustrated as emanating from a point source at focus F and, due to the parabolic characteristic of the surfaces, are reflected back upon focus F. This is illustrated for two separate paths of light, one path being formed by rays FA, AB, BF, and the second path being formed by rays FC, CD, DF.

In FIG. 4, structure 20 is illustrated together with a unique effect produced thereby. In this figure, a point source of light is assumed to be situated at point G which is displaced from point F. In the usual type of reflector used for concentrating light at a point, such as a spherical or parabolic reflector, the real image is inverted in the reflection process so that, if the source is shifted to the left, for instance, the real image is shifted to the right, and vice versa. In fabrication of lasers wherein, in order to produce standing waves it is essential that light be reflected back upon the source, a slight change in position of the reflector with respect to the laser can cause the reflected light rays to miss the active region of the laser because the real image falls elsewhere, thus inhibiting occurrence of light amplification by stimulated emission of radiation. However, the structure of FIG. 4 eliminates this problem. As long as the source of light is situated in the focal plane of structure 20 which, as shown in FIG. 2, is the plane through focus F perpendicular to axis 15 about which the parabola is rotated, the light produced by the source at point G is reflected back upon the source as illustrated by the path formed by light rays GH, HJ, JG. Additionally, a second path of light, illustrated by rays GK, KL, LG, also returns to impinge upon the source. Thus, if the source undergoes displacement from the focus, the reflected image follows the source, preventing errors in operation due to misalignment of the light source.

FIG. 5 illustrates an application of the device shown in FIGS. 3 and 4 for use with a laser, such as a semiconductor junction type of laser. Thus, a semiconductor laser diode 21, such as described in R. N. Hall Pat. No. 3,245,002 issued Apr. 5, 1966 and assigned to the instant assignee, and which may typically be comprised of gallium arsenide, is shown joined to reflector 20. Diode 21, which includes a P-type conductivity region 22, an N-type conductivity region 23, and a P-N junction region 24, receives forward bias from a power supply 25 which may be pulsed if desired. Reflector 20, in this embodiment, comprises a solid having a planar surface 27 that is contiguous with a transparent, nonreflecting planar surface 26 of monocrystalline body 21 which, in turn, is perpendicular to the plane of P-N junction 24. The interface of surfaces 26 and 27 is desirably completely transparent to radiation originating from diode 21. Emitting surface 25 of injection laser diode 21, which is partially transparent to radiation and partially reflective thereto, is also perpendicular to the plane of P-N junction region 24. Although junction region 24 is positioned to be as close to the focus of reflector 20 as possible, the device will operate properly even if, due to misalignment, the junction region of laser diode 21 is not precisely positioned at the focus of reflector 20. However, the junction region must be positioned within the focal plane of reflector 20, which coincides with surface 27 thereof. Those skilled in the art will recognize that the portion of structure 20 which is in the vicinity of diode 21 may be of constant diameter if desired, provided reflection from the surface in this region is not essential to operation, by cutting structure 16 of FIG. 2 with a plane perpendicular to axis of rotation 15 but displaced from point F, and then extending cylindrically the shorter one of the resulting structures to a plane passed through point F perpendicular to axis of rotation 15. This may be done where reflector size limitations are quite stringent, for example.

Reflector 20 may be fabricated of any one of a plurality of materials including, for example, pure gallium arsenide, optical glass, zinc sulfide, magnesium oxide, and aluminum oxide. These materials are also suitable in the event that harmonic generation is desired. Harmonic generation also may be accomplished if reflector 20 is fabricated of ammonium dihydrogen phosphate, potassium dihydrogen phosphate, lithium niobate, etc. Zinc oxide is a preferred material for reflector 20 since its refractive index closely matches that of gallium arsenide. This results in improved optical transmission at the interface between reflector 20 and laser diode 21. The principal requirement for material of the reflector is that the material be substantially transparent, and preferably entirely transparent, at the frequency of coherent radiation from the laser. Optical uniformity and dimensional temperature stability are also advantageous properties. For optical uniformity, optical glass is a highly desirable reflector material; for dimensional temperature stability and hence constant frequency light emission, quartz is a highly desirable reflector material. In devices wherein harmonics are desired, the reflector material is selected to possess a nonlinear dielectric constant at the laser frequency together with a substantial transparency at both the fundamental and the harmonic frequency; conversely, in applications where the harmonics represent undesired components they are inhibited by providing a light transmitting material whose dielectric constant is linear at the fundamental frequency.

A body of the selected reflector material is cut and ground to provide the desired configuration, and the surfaces thereof are polished to optical smoothness. With most reflector materials, such as gallium arsenide for example, the angles of incidence on the surfaces of the reflectors normally provide total internal reflection; therefore, no silvering or other reflective coating is required, although such coating may be desiable with some materials, such as optical glass for example, depending largely on the refractive index of the material.

Reflector body 20 and laser diode 21 are advantageously joined by pressing their respective contiguous flat surfaces 27 and 26 into optical contact in a jig, so that light emitted by diode 21 may be reflected by reflector body 20 without passing through an intervening material of sufficient thickness to produce appreciable reflection. Alternative means for joining the reflector and laser diode are well-known to those skilled in the art, and include the use of refractive-index-matching cement, such as Canada Balsam, particularly when the reflector is fabricated from optical glass.

In operation, reflector 20 receives radiation emitted from the edge of junction 24 at surface 26, and returns the radiation to junction region 24 at surface 26 after one reflection if laser diode 21 is both situated exactly at the focus of reflector 20 and its radiation is directed exactly perpendicular to surface 27, or after two reflections if diode 21 is somewhat displaced from the focus of reflector 20 or fails to direct its radiation exactly perpendicular to surface 27. Since the overall path length traversed by light within reflector 20 is dependent not only upon the dimensions of reflector 20 but also upon the position of diode 21 with respect to the focus of reflector 20, the reflector returns the coherent radiation to junction 24 at a phase determined by the dimensions of reflector 20 and the particular path followed by the radiation.

Alternatively, the reflecting surface may comprise the inside surface 30 of a hollow object 31 interiorly shaped in the desired configuration, as illustrated in FIG. 6. The material of object 31 may comprise Invar, a generic name for a low thermal co-efficient of expansion alloy having a composition of approximately 36% nickel, 0.5% manganese, 0.1% copper, remainder iron for example, if dimensional temperature stability is desired, due to the low temperature coefficient of expansion thereof. If other materials, such as various metals, are utilized for the body of object 31, reflecting surface 30 may be formed by first roughly shaping the surface in the metal, then coating the surface with an epoxy or glass and, while the epoxy or glass is maintained in a pliable condition, finish-shaped by impressing a mandrel or form with the desired surface configuration into the object and allowing the epoxy or molten glass to harden. A highly reflective metal such as silver or aluminum is then evaporated onto surface 30 after the shaping mandrel has been removed from the object. Laser diode 21 may then be affixed to a transparent plate such as a sheet of glass 32 and the glass mounted against object 31 such that surface 26 of junction 24 of the diode is situated in the focal plane of reflecting surface 30 in optical contact with the reflecting surface.

The foregoing describes a reflector which focuses light back onto the source in the focal plane no matter where in the focal plane the source may be. The reflector enhances modes having purely spherical wavefronts, and is useful in reflecting light emitted by a laser back down to a point which may be within or outside of the active region of the laser. The structure is also useful for harmonic generation or other purposes where a very high photon density is required. Moreover, it is also feasible to construct the laser so as to incorporate the reflector described herein at either end of the light emitting structure.

I claim:

1. Light reflector means comprising, a curved surface generated by rotating a parabola having a predetermined focus and directrix about an axis housing said focus parallel to said directrix, said surface being bounded by a plane surface along the focal plane of said curved surface perpendicular to said axis and through said focus, said curved surface being rendered optically reflective on at least one side thereof so as to cause light thereupon from any point in the focal plane of said curved surface to be returned, after two reflections to the point of origin.

2. The light reflector means of claim 1 wherein said reflector means consists of one of the group consisting of quartz and Invar so as to exhibit dimensional temperature stability.

References Cited

UNITED STATES PATENTS 3,325,666 6/1967 Bird et al. _____ 350—1
3,359,507 12/1967 Hall _____ 331—94.5

OTHER REFERENCES

C. Haswell, Mensuration and Practical Geometry, 188–197 (1858).

DAVID SCHONBERG, Primary Examiner

J. W. LEONARD, Assistant Examiner

U.S. Cl. X.R.

331—94.5; 350—294